United States Patent
Zhou et al.

(10) Patent No.: US 12,160,318 B2
(45) Date of Patent: Dec. 3, 2024

(54) HARQ FEEDBACK FOR DCI-BASED BEAM CONFIGURATION AND/OR PATHLOSS REFERENCE SIGNAL CONFIGURATION

(71) Applicant: QUALCOMM Incorporated, San Diego, CA (US)

(72) Inventors: Yan Zhou, San Diego, CA (US); Tao Luo, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,409

(22) Filed: Oct. 28, 2020

(65) Prior Publication Data

US 2021/0184800 A1 Jun. 17, 2021

Related U.S. Application Data

(60) Provisional application No. 62/947,900, filed on Dec. 13, 2019.

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0048* (2013.01); *H04W 72/046* (2013.01); *H04W 72/21* (2023.01); *H04W 72/23* (2023.01)

(58) Field of Classification Search
CPC ..... H04L 5/0035; H04L 1/0073; H04L 5/001; H04L 5/0048; H04L 27/2602;
(Continued)

(56) References Cited

U.S. PATENT DOCUMENTS 10,512,075 B2 12/2019 John Wilson et al.
10,602,488 B2 3/2020 Rico Alvarino et al.
(Continued)

FOREIGN PATENT DOCUMENTS

CN 108604946 A 9/2018
WO 2017069849 A1 4/2017
(Continued)

OTHER PUBLICATIONS

International Search Report and Written Opinion—PCT/US2020/070721—ISA/EPO—dated Feb. 23, 2021.
(Continued)

*Primary Examiner* — Yee F Lam
(74) *Attorney, Agent, or Firm* — Harrity & Harrity, LLP

(57) ABSTRACT

Various aspects of the present disclosure generally relate to wireless communication. In some aspects, a user equipment (UE) may receive a downlink control information (DCI) communication that includes downlink and/or uplink beam activation information or pathloss reference signal activation information. The UE may determine whether to transmit hybrid automatic repeat request (HARQ) feedback for the DCI communication. The UE may selectively transmit the HARQ feedback based at least in part on determining whether to transmit the HARQ feedback for the DCI communication. Numerous other aspects are provided.

30 Claims, 4 Drawing Sheets

(51) Int. Cl.
*H04W 72/04* (2023.01)
*H04W 72/044* (2023.01)
*H04W 72/21* (2023.01)
*H04W 72/23* (2023.01)

(58) Field of Classification Search
CPC ... H04L 1/1887; H04L 1/1854; H04L 5/0091; H04L 1/08; H04L 5/0055; H04L 27/26; H04L 1/1671; H04L 5/14; H04L 5/0023; H04W 74/08; H04W 72/1284
See application file for complete search history.

(56) References Cited

U.S. PATENT DOCUMENTS

| | | | |
|---|---|---|---|
| 10,686,564 B2 | 6/2020 | Akkarakaran et al. | |
| 2018/0343653 A1* | 11/2018 | Guo | H04W 72/1273 |
| 2019/0082456 A1* | 3/2019 | Kim | H04W 74/08 |
| 2019/0281588 A1* | 9/2019 | Zhang | H04L 5/0051 |
| 2019/0313386 A1* | 10/2019 | Hwang | H04W 72/042 |
| 2019/0349867 A1* | 11/2019 | MolavianJazi | H04W 52/146 |
| 2020/0100193 A1* | 3/2020 | Cheng | H04W 52/146 |
| 2020/0205150 A1* | 6/2020 | Cheng | H04W 72/21 |
| 2020/0259625 A1* | 8/2020 | Papasakellariou | H04B 7/0456 |
| 2020/0267663 A1* | 8/2020 | Xu | H04W 52/242 |
| 2021/0014026 A1* | 1/2021 | Papasakellariou | H04L 1/1861 |
| 2021/0050933 A1* | 2/2021 | Myung | H04L 5/0094 |
| 2021/0051710 A1* | 2/2021 | Cirik | H04L 5/0053 |
| 2021/0092763 A1* | 3/2021 | Li | H04W 72/21 |
| 2021/0144720 A1* | 5/2021 | Xu | H04W 80/02 |
| 2021/0184812 A1* | 6/2021 | MolavianJazi | H04L 5/0048 |

FOREIGN PATENT DOCUMENTS

| | | |
|---|---|---|
| WO | 2017138853 A1 | 8/2017 |
| WO | 2018144168 | 8/2018 |
| WO | 2018194773 A1 | 10/2018 |
| WO | 2019028857 A1 | 2/2019 |

OTHER PUBLICATIONS

Qualcomm: "Beam Management for NR", 3GPP Draft, 3GPP TSG-RAN WG1 #90bis, R1-1718541, 3rd Generation Partnership Project (3GPP), Mobile Competence Centre, 650, Route Des Lucioles, F-06921 Sophia-Antipolis Cedex, France, vol. RAN WG1, No. Prague. P.R. Czechia, Oct. 9, 2017-Oct. 13, 2017, Oct. 8, 2017 (Oct. 8, 2017), XP051341723, 17 Pages, Retrieved from the Internet: URL: http://www.3gpp.org/ftp/tsg_ran/WG1_RL1/TSGR1_90b/Docs/, http://www.3gpp.org/ftp/tsg_ran/WG1_RL1/TSGR1_90b/Docs/ [retrieved on Oct. 8, 2017], fig. 1+par. 3.1.1, 4., 6.,9, fig 0-1, Section 2.1, Section 2.2, Section 3.

Qualcomm Incorporated: "Remaining Details on QCL", 3GPP TSG RAN WG1 Meeting AH 1801, 3GPP Draft; R1-1800867, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018 (Jan. 13, 2018), XP051385137, pp. 1-8, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018], Section 2.1.2, Section 2, Figures 2-1(c), 2-1(d).

ZTE, et al., "Mode 1 Resource Allocation Schemes on Sidelink", 3GPP TSG RAN WG1 #99, R1-1912552, Reno, Nevada, US, Nov. 18-22, 2019, pp. 1-9.

* cited by examiner

HARQ FEEDBACK FOR DCI-BASED BEAM CONFIGURATION AND/OR PATHLOSS REFERENCE SIGNAL CONFIGURATION

CROSS-REFERENCE TO RELATED APPLICATION

This patent application claims priority to U.S. Provisional Patent Application No. 62/947,900, filed on Dec. 13, 2019, entitled "HARQ FEEDBACK FOR DCI-BASED BEAM CONFIGURATION AND/OR PATHLOSS REFERENCE SIGNAL CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for hybrid automatic repeat request (HARQ) feedback for downlink control information (DCI)-based beam configuration and/or pathloss reference signal configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a downlink control information (DCI) communication that includes downlink and/or uplink beam activation information or pathloss reference signal activation information; determining whether to transmit hybrid automatic repeat request (HARQ) feedback for the DCI communication; and selectively transmitting the HARQ feedback based at least in part on determining whether to transmit the HARQ feedback for the DCI communication.

In some aspects, a UE for wireless communication may include memory and one or more processors operatively coupled to the memory. The memory and the one or more processors may be configured to receive a DCI communication that includes downlink and/or uplink beam activation information or pathloss reference signal activation information; determine whether to transmit HARQ feedback for the DCI communication; and selectively transmit the HARQ feedback based at least in part on determining whether to transmit the HARQ feedback for the DCI communication.

In some aspects, a non-transitory computer-readable medium may store one or more instructions for wireless communication. The one or more instructions, when executed by one or more processors of a UE, may cause the one or more processors to receive a DCI communication that includes downlink and/or uplink beam activation information or pathloss reference signal activation information; determine whether to transmit HARQ feedback for the DCI communication; and selectively transmit the HARQ feedback based at least in part on determining whether to transmit the HARQ feedback for the DCI communication.

In some aspects, an apparatus for wireless communication may include means for receiving a DCI communication that includes downlink and/or uplink beam activation information or pathloss reference signal activation information; means for determining whether to transmit HARQ feedback for the DCI communication; and means for selectively transmitting the HARQ feedback based at least in part on determining whether to transmit the HARQ feedback for the DCI communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
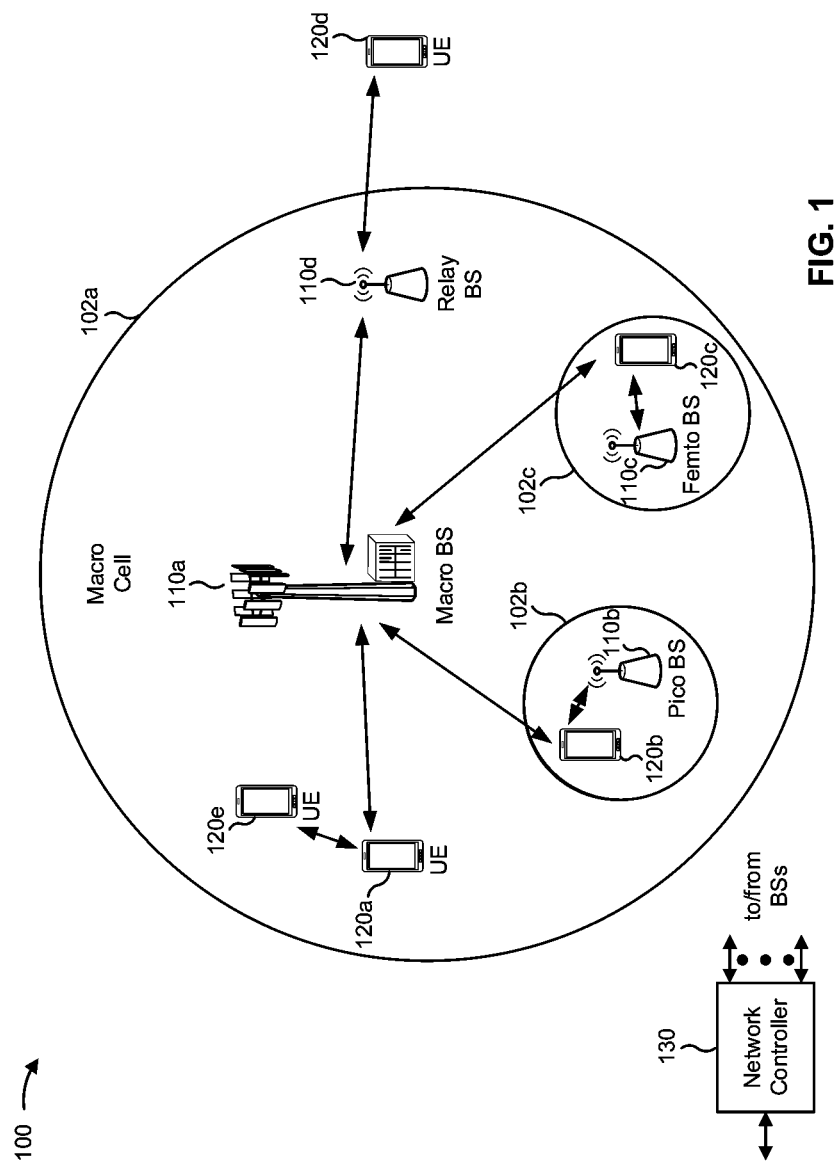
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some cases, a UE 120 and a base station 110 may perform beam management (sometimes abbreviated BM) to establish and/or refine beams for communication between the UE 120 and the base station 110. Beam management may enable intra-cell mobility (e.g., as a physical orientation of a UE 120 changes, as clusters or blocking objects in the channel change, and/or the like) and inter-cell mobility (e.g., when a UE 120 is handed over from one base station 110 to another base station 110 in the wireless network 100 or another wireless network), among other procedures.

As indicated above, FIG. 1 is provided as an example. Other examples may differ from what is described with regard to FIG. 1.

Figure 2:
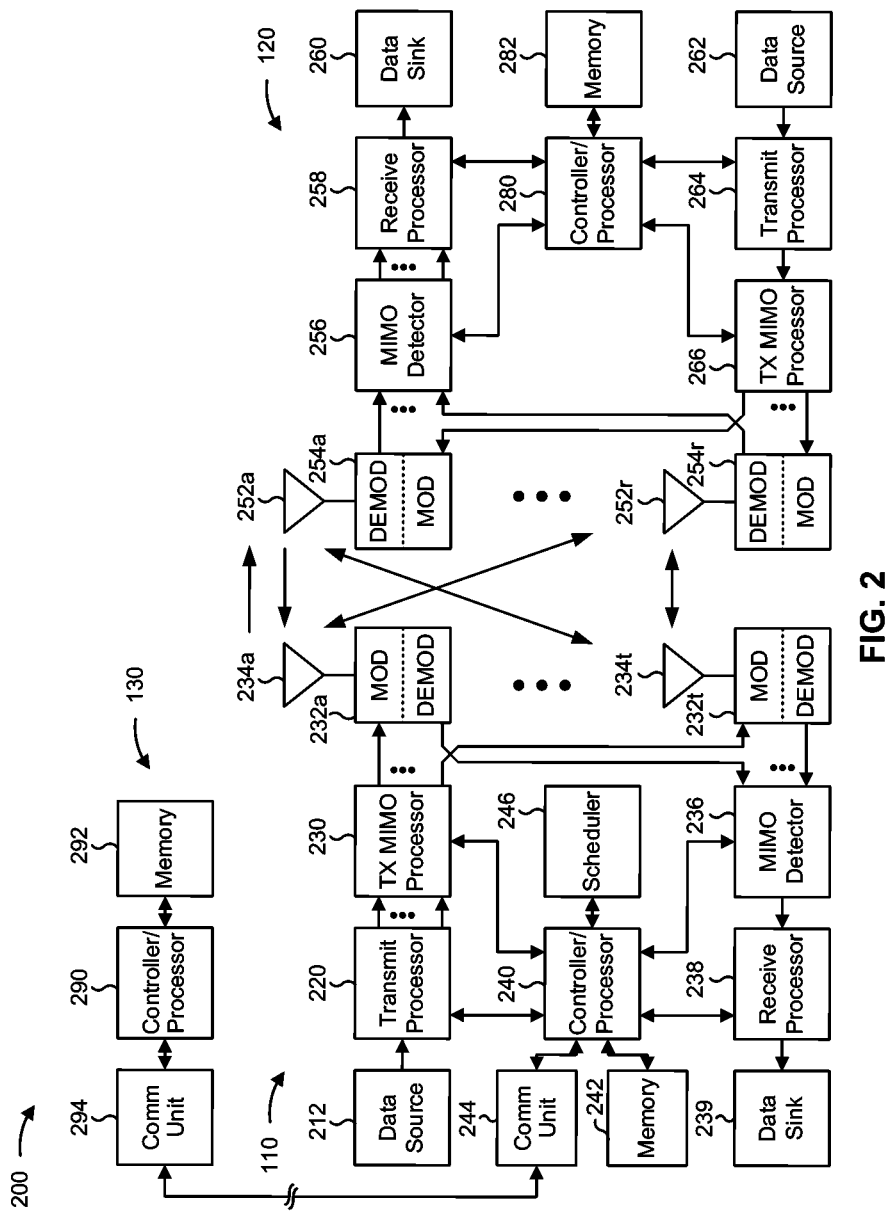
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with hybrid automatic repeat request (HARD) feedback for downlink control information (DCI)-based beam configuration and/or pathloss reference signal configuration, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for receiving a DCI communication that includes downlink and/or uplink beam activation information or pathloss reference signal activation information, means for determining whether to transmit HARQ feedback for the DCI communication, means for selectively transmitting the HARQ feedback based at least in part on determining whether to transmit the HARQ feedback for the DCI communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Wireless communication devices, such as UEs, BSs, transmit-receive points (TRPs), and/or the like, may communicate with each other using beams. A beam may be defined using a transmission configuration indication (TCI) state. A TCI state for a beam may indicate a source reference signal and a quasi-colocation (QCL) type to be used for the beam. The QCL type may correspond to one or more QCL relationships that indicate how the source reference signal is to be quasi-colocated (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal.

In some cases, a BS and/or a UE may be capable of downlink and/or uplink beam management. In such cases, the BS may be capable of configuring one or more beam management parameters, may be capable of activating and/or deactivating uplink and/or downlink beams, and/or the like for the UE. As an example, the BS may be capable of configuring, activating and/or deactivating uplink and/or downlink TCI states, such as physical downlink control channel (PDCCH) TCI states, physical downlink shared channel (PDSCH) TCI states, channel state information reference signal (CSI-RS) TCI states, physical uplink control channel (PUCCH) TCI states, physical uplink shared channel (PUSCH) TCI states, physical random access channel (PRACH) TCI states, sounding reference signal (SRS) TCI states, and/or the like. As another example, the BS may be capable of configuring, activating, and/or deactivating uplink spatial relations (e.g., which may include indications of beam and/or BS co-location, quasi-co-location, and/or the like), such as PUCCH spatial relations, SRS spatial relations, and/or the like.

Moreover, the BS may be capable of configuring one or more pathloss reference signal parameters, capable of activating and/or deactivating pathloss reference signal transmission for the UE, and/or the like. In some aspects, the BS and/or the UE may use the pathloss reference signal to track, manage, and compensate for mobility of the BS and/or the UE in the wireless network. For example, the BS may configure pathloss reference signal parameters that indicate the time-frequency resources in which the UE is to transmit the pathloss reference signal, that configure the UE to periodically, semi-persistently, or aperiodically transmit the pathloss-reference signal, and/or the like.

In some circumstances, the beam management parameters and/or pathloss reference signal parameters for a UE may change frequently. For example, a UE may encounter frequent blockages or may change position or orientation quickly. In these circumstances, significant latency and overhead may occur, thus consuming computing resources. For example, there may be latency and overhead involved in transmitting and measuring reference signals, communicating regarding beam configuration or identity, and/or the like. If a higher-layer signaling technique (e.g., medium access control (MAC) signaling, such as a MAC control element (MAC-CE)) is used to transmit uplink and/or downlink beam activation information and/or pathloss reference signal activation information, the UE may experience significant latency (e.g., multiple milliseconds or more) while waiting for, processing the higher-layer signaling, and applying the activation command.

Some techniques and apparatuses described herein provide physical-layer signaling of uplink and/or downlink beam activation information and/or pathloss reference signal activation information, which may include activation of an uplink beam configuration, a downlink beam configuration, or a pathloss reference signal configuration, and/or the like. In some aspects, a BS may transmit uplink and/or downlink beam activation information and/or pathloss reference signal activation information in a DCI communication, as opposed to a radio resource control (RRC) communication or a MAC-CE, to reduce latency and overhead in the beam and/or pathloss reference signal management process.

To ensure that a UE successfully receives the uplink and/or downlink beam activation information and/or pathloss reference signal activation information, the UE in some cases may transmit HARQ feedback for the DCI communication. The HARQ feedback may indicate whether the UE was able to successfully decode the DCI communication and obtain the uplink and/or downlink beam activation information and/or pathloss reference signal activation information. In this way, the HARQ feedback may increase the reliability of the DCI communication carrying the uplink and/or downlink beam activation information and/or pathloss reference signal activation information because the HARQ feedback can indicate that the DCI communication was successfully received, or may prompt the BS to retransmit the DCI communication if the UE transmits HARQ feedback indicating that the UE was unable to decode the DCI communication (or if the BS does not receive an indication that the DCI communication was successfully received).

Figure 3:
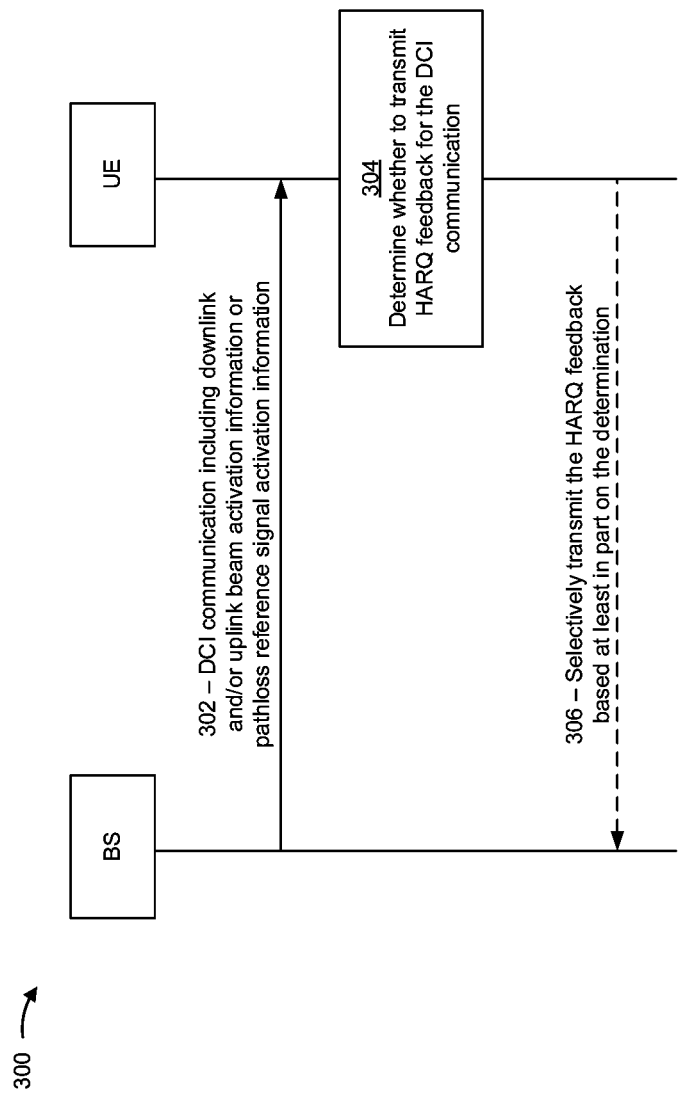
FIG. 3 is a diagram illustrating one or more examples of hybrid automatic repeat request (HARQ) feedback for downlink control information (DCI)-based beam configuration and/or pathloss reference signal configuration, in accordance with various aspects of the present disclosure.

FIG. 3 is a diagram illustrating one or more examples 300 of HARQ feedback for DCI-based beam configuration and/or pathloss reference signal configuration, in accordance with various aspects of the present disclosure. As shown in FIG. 3, example(s) 300 include communication between a BS (e.g., BS 110) and a UE (e.g., UE 120). In some aspects, the BS and the UE may be included in a wireless network such as wireless network 100. In some aspects, the BS and the UE may communicate on an access link, which may include an uplink and a downlink.

In some aspects, the BS and the UE may be capable of multi-beam operation on the uplink and/or the downlink. For example, the BS and the UE may be capable of communicating on the downlink using one or more downlink beams, may be capable of communicating on the uplink using one or more uplink beams, and/or the like. In some aspects, the BS and/or the UE may be capable of downlink and/or uplink beam management. In this case, the BS may be capable of configuring one or more beam management parameters, may be capable of activating and/or deactivating uplink and/or downlink beams, and/or the like. As an example, the BS may be capable of configuring, activating, and/or deactivating uplink and/or downlink TCI states, such as PDCCH TCI states, PDSCH TCI states, CSI-RS TCI states, PUCCH TCI states, PUSCH TCI states, physical random access channel (PRACH) TCI states, SRS TCI states, and/or the like. As another example, the BS may be capable of configuring, activating, and/or deactivating uplink spatial relations (e.g., which may include indications of beam and/or BS co-location, quasi-co-location, and/or the like), such as PUCCH spatial relations, SRS spatial relations, and/or the like.

In some aspects, the BS may be capable of configuring one or more pathloss reference signal parameters, capable of activating and/or deactivating pathloss reference signal transmission for the UE, and/or the like. In some aspects, the BS and/or the UE may use the pathloss reference signal to track, manage, and compensate for mobility of the BS and/or the UE in the wireless network. For example, the BS may configure pathloss reference signal parameters that indicate the time-frequency resources in which the UE is to transmit the pathloss reference signal, that configure the UE to periodically, semi-persistently, or aperiodically transmit the pathloss-reference signal, and/or the like.

As shown in FIG. 3, and by reference number 302, to perform uplink and/or downlink beam management and/or pathloss reference signal management for the UE, the BS may transmit a DCI communication that includes uplink and/or downlink beam activation information and/or pathloss reference signal activation information. In some aspects, the BS may transmit uplink and/or downlink beam activation information and/or pathloss reference signal activation information in a DCI communication, as opposed to a radio resource control (RRC) communication or a MAC-CE, to reduce latency and overhead in the beam and/or pathloss reference signal management process.

In some aspects, the uplink and/or downlink beam activation information may include information indicating an activation of one or more uplink beams and/or one or more downlink beams, an activation of a PDCCH TCI state, information indicating an activation of a PDSCH TCI state, information indicating an activation of a CSI-RS TCI state, information indicating an activation of a spatial relation for a PUCCH or an SRS, information indicating activation of an uplink TCI state for a PUCCH, a PUSCH, a PRACH, or an SRS, and/or the like. In this case, the UE may activate one or more uplink and/or downlink beams, one or more TCI states, one or more spatial relations, and/or the like based at least in part on receiving the DCI communication.

In some aspects, the pathloss reference signal activation information may include information indicating an activation of a pathloss reference signal on a PUCCH, on a PUSCH, for an SRS, and/or the like. In this case, the UE may transmit the pathloss reference signal based at least in part on receiving the DCI communication.

In some aspects, the B S may transmit the DCI communication including the uplink and/or downlink beam activation information and/or the pathloss reference signal activation information based at least in part on mobility of the BS and/or mobility of the UE. The mobility may include inter-cell mobility, intra-cell mobility, and/or the like.

As further shown in FIG. 3, and by reference number 304, the UE may determine whether to transmit HARQ feedback for the DCI communication. The HARQ feedback may include an acknowledgement (ACK) of the DCI communication or a negative ACK (NACK) for the DCI communication. The ACK may indicate that the UE successfully decoded the DCI communication, whereas the NACK may indicate that decoding of the DCI communication was unsuccessful.

In some aspects, the UE may determine whether to transmit HARQ feedback for the DCI communication based at least in part on a HARQ feedback rule (e.g., an ACK/NACK rule), which may be configured or hard coded at the UE, may be identified in a table, a specification, or another data structure, and/or the like. In this case, the UE may determine whether to transmit HARQ feedback for the DCI communication without additional signaling from the BS. The HARQ feedback rule may indicate that the UE is to transmit an ACK or a NACK for DCI communications carrying uplink and/or downlink beam activation information and/or pathloss reference signal activation information, or may indicate that no dedicated ACK/NACK feedback is needed for DCI communications carrying uplink and/or downlink beam activation information and/or pathloss reference signal activation information.

In some aspects, the HARQ feedback rule (e.g., the ACK/NACK rule) may indicate that the UE is to transmit (or refrain from transmitting) HARQ feedback based at least in part on a HARQ codebook type (e.g., a HARQ-ACK codebook type) associated with the DCI communication. As an example, the HARQ feedback rule may indicate that the UE is to transmit an ACK or a NACK for a DCI communication that carries uplink and/or downlink beam activation information and/or pathloss reference signal activation information and is associated with a type 2 HARQ codebook. As another example, the HARQ feedback rule may indicate that no dedicated ACK/NACK feedback is needed for a DCI communication that carries uplink and/or downlink beam activation information and/or pathloss reference signal activation information and is associated with a type 1 HARQ codebook.

In some aspects, the HARQ feedback rule (e.g., the ACK/NACK rule) may indicate that the UE is to transmit (or refrain from transmitting) HARQ feedback based at least in part on whether a DCI communication carrying uplink and/or downlink beam activation information and/or pathloss reference signal activation information also dynamically or semi-percipiently schedules other signals (e.g., downlink signals and/or uplink signals). As an example, the HARQ feedback rule may indicate that the UE is to transmit an ACK or a NACK for a DCI communication that carries uplink and/or downlink beam activation information and/or pathloss reference signal activation information and that further schedules semi-persistent downlink resources (e.g., one or more slots, one or more symbols, one or more subcarriers, one or more component carriers, one or more resource blocks, one or more resource elements, and/or the like) and/or uplink configured grant resources. As another example, the HARQ feedback rule may indicate that no dedicated ACK/NACK feedback is needed for a DCI communication that carries uplink and/or downlink beam activation information and/or pathloss reference signal activation information and that further dynamically schedules downlink resources and/or uplink resources.

In some aspects, the BS may dynamically and/or semi-persistently configure the HARQ feedback rule (e.g., the ACK/NACK rule). In some aspects, the BS may dynamically configure the UE to transmit (or refrain from transmitting) HARQ feedback for DCI communications carrying uplink and/or downlink beam activation information and/or pathloss reference signal activation information. In this case, the BS may transmit an indication of the HARQ feedback rule (e.g., the ACK/NACK rule) or an indication to transmit (or refrain from transmitting) HARQ feedback for DCI communications carrying uplink and/or downlink beam activation information and/or pathloss reference signal activation information. In some aspects, the BS may transmit the indication(s) (e.g., the indication of the HARQ feedback rule and/or the indication to transmit the HARQ feedback) in an RRC communication, a MAC-CE communication, in the DCI communication carrying uplink and/or downlink beam activation information and/or pathloss reference signal activation information, in another DCI communication, and/or the like.

As further shown in FIG. 3, and by reference number 306, the UE may selectively transmit the HARQ feedback based at least in part on determining whether to transmit HARQ feedback for the DCI communication. For example, the UE may transmit the HARQ feedback (e.g., an ACK or a NACK) based at least in part on determining to transmit HARQ feedback for the DCI communication. As another example, the UE may refrain from transmitting the HARQ feedback based at least in part on determining to refrain from transmitting HARQ feedback for the DCI communication.

In some aspects, the UE may transmit a single instance of the HARQ feedback to the BS. In some aspects, repetition and/or beam sweeping may be enabled for PUCCH or PUSCH carrying the HARQ feedback such that the UE transmits the HARQ feedback with repetition and/or transmits the HARQ feedback across a plurality of beams. In this case, the UE may transmit the HARQ feedback with repetition across a plurality of beams such that the repetitions of the HARQ feedback are spatial division multiplexed, frequency division multiplexed, and/or time division multiplexed (e.g., slot or sub-slot time division multiplexing).

In some aspects, repetition and/or beam sweeping for the HARQ feedback may be enabled via a specification, a table, and/or another type of data structure configured and/or hard coded at the UE. In some aspects, repetition and/or beam sweeping for the HARQ feedback may be enabled via a HARQ feedback rule (e.g., an ACK/NACK rule). In some aspects, repetition and/or beam sweeping for the HARQ feedback may be enabled via signaling from the BS. In this case, the UE may transmit the HARQ feedback with repetition across a plurality of beams based least in part on receiving an indication from the BS to transmit the HARQ feedback with repetition across the plurality of beams. The indication may be received in an RRC communication, a MAC-CE communication, the DCI communication carrying uplink and/or downlink beam activation information and/or pathloss reference signal activation information, another DCI communication, and/or the like.

In some aspects, the UE may transmit the HARQ feedback after a time gap between the DCI communication carrying uplink and/or downlink beam activation information and/or pathloss reference signal activation information and an uplink communication in which the UE is to transmit the HARQ feedback. In this case, the UE may transmit the HARQ feedback in an uplink communication based at least in part on a timing offset relative to reception of the DCI communication. The timing offset or time gap may be in terms of symbols from the end of the DCI communication to the start of the transmission of the uplink communication, may be in terms of slots from the end of a slot carrying the DCI communication to the start of the slot carrying the uplink communication, and/or the like. In some aspects, the timing offset or time gap may include one or more symbols from an end of reception of the DCI communication to a start of a transmission of the HARQ feedback, one or more slots from the end of the reception of the DCI communication to the start of the transmission of the HARQ feedback, and/or the like.

In some aspects, if the HARQ feedback is to be transmitted with repetition, and if the timing offset or time gap is in terms of symbols, the timing offset or time gap may be from reception of the DCI communication to the end of the first repetition of the HARQ feedback, the last repetition of the HARQ feedback, a particular repetition between the first repetition and the last repetition, and/or the like. In some aspects, if the timing offset or time gap is in terms of slots, the timing offset or time gap may be from the end of a slot carrying the DCI communication to the end of the slot of the first repetition of the HARQ feedback, to the end of the slot of the last repetition of the HARQ feedback, to the end of the slot of a particular repetition between the first repetition and the last repetition, and/or the like. In some aspects, the timing offset or time gap may include one or more symbols from an end of reception of the DCI communication to a start of a transmission of a first repetition of the HARQ feedback, one or more slots from the end of the reception of the DCI communication to the start of the transmission of the first repetition of the HARQ feedback, one or more symbols from an end of reception of the DCI communication to a start of a transmission of a last repetition of the HARQ feedback, one or more symbols from the end of the reception of the DCI communication to the start of the transmission of the last repetition of the HARQ feedback, one or more symbols from an end of reception of the DCI communication to a start of a transmission of a repetition of the HARQ feedback between a first repetition of the HARQ feedback and a last repetition of the HARQ feedback, one or more symbols from the end of the reception of the DCI communication to the start of the transmission of the repetition of the HARQ feedback between the first repetition of the HARQ feedback and the last repetition of the HARQ feedback, and/or the like.

In some aspects, a timing offset or time gap may be indicated or configured via a specification, a table, and/or another type of data structure configured and/or hard coded at the UE. In some aspects, a timing offset or time gap may be indicated or configured via a HARQ feedback rule (e.g., an ACK/NACK rule). In some aspects, a timing offset or time gap may be indicated or configured via signaling from the BS. For example, the indication may be received in an RRC communication, a MAC-CE communication, the DCI communication carrying uplink and/or downlink beam activation information and/or pathloss reference signal activation information, another DCI communication, and/or the like.

In some aspects, the UE may transmit the HARQ feedback in an uplink communication in which HARQ feedback information (e.g., HARQ-ACK information) may be multiplexed with other uplink control information and/or data in PUSCH. In this case, the resource allocation for the HARQ feedback information (e.g., the HARQ-ACK information) may be based at least in part on whether the HARQ feedback information is multiplexed with other uplink control information and/or data in PUSCH. For example, more resources may be allocated for the HARQ feedback information if the HARQ feedback information includes the HARQ feedback for the DCI communication and is multiplexed with other uplink control information and/or data in PUSCH, relative to a case in which the HARQ feedback information does not include the HARQ feedback for the DCI communication.

In some aspects, the resource allocation for the HARQ feedback information (e.g., the HARQ-ACK information) may be indicated by a betaOffsetACK-Index parameter (e.g., a betaOffsetACK-Index1 parameter, a betaOffsetACK-Index2, parameter, a betaOffsetACK-Index3 parameter, and/or the like). In this case, the betaOffsetACK-Index parameter may be configured with two values, a first value for resource allocation in the case where the HARQ feedback information includes the HARQ feedback for the DCI communication and is multiplexed with other uplink control information and/or data in PUSCH, and a second value for resource allocation in the case where the HARQ feedback information does not include the HARQ feedback for the DCI communication. For a given betaOffsetACK-Index parameter, the UE may determine which of the two values to use based at least in part on whether the HARQ feedback information includes the HARQ feedback for the DCI communication and is multiplexed with other uplink control information and/or data in PUSCH.

In some aspects, the BS may dynamically indicate a value for resource allocation for a particular betaOffsetACK-Index parameter. In this case, the BS may dynamically indicate (e.g., via the DCI communication carrying uplink and/or downlink beam activation information and/or pathloss reference signal activation information or another DCI communication) the value for resource allocation for a particular betaOffsetACK-Index parameter where the HARQ feedback information includes the HARQ feedback for the DCI communication and is multiplexed with other uplink control information and/or data in PUSCH. In this way, the BS may indicate a more aggressive value (e.g., may allocate more resources) if the BS expects or anticipates that the HARQ feedback information will include the HARQ feedback for the DCI communication and will be multiplexed with other uplink control information and/or data in PUSCH.

In this way, the UE is capable of determining whether to transmit HARQ feedback for a DCI communication carrying uplink and/or downlink beam activation information and/or pathloss reference signal activation information, and selectively transmitting the HARQ feedback based at least in part on the determinization. The HARQ feedback may indicate whether the UE was able to successfully decode the DCI communication and obtain the uplink and/or downlink beam activation information and/or pathloss reference signal activation information. In this way, the HARQ feedback may increase the reliability of the DCI communication carrying the uplink and/or downlink beam activation information and/or pathloss reference signal activation information, because the HARQ feedback can indicate that the DCI communication was successfully received, or may prompt the BS to retransmit the DCI communication if the UE transmits HARQ feedback indicating that the UE was unable to decode the DCI communication (or if the BS does not receive an indication that the DCI communication was successfully received).

As indicated above, FIG. 3 is provided as one or more examples. Other examples may differ from what is described with respect to FIG. 3.

Figure 4:
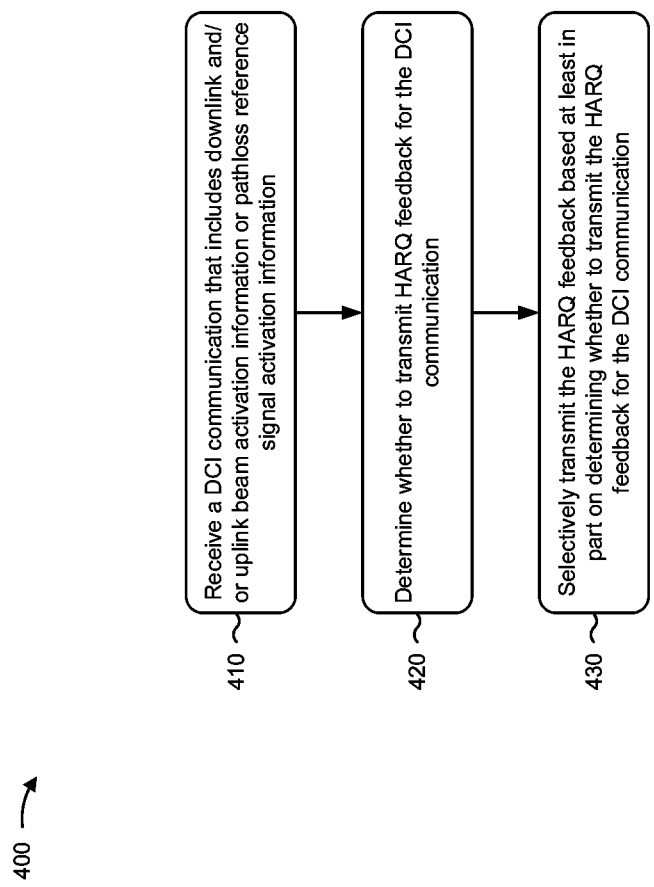
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 of FIG. 1, UE 120 of FIG. 2, the UE of FIG. 3, and/or the like) performs operations associated with HARQ feedback for DCI-based beam configuration and/or pathloss reference signal configuration.

As shown in FIG. 4, in some aspects, process 400 may include receiving a DCI communication that includes downlink and/or uplink beam activation information or pathloss reference signal activation information (block 410). For example, the UE (e.g., using receive processor 258, transmit processor 264, controller/processor 280, memory 282, and/or the like) may receive a DCI communication that includes downlink and/or uplink beam activation information or pathloss reference signal activation information, as described above.

As further shown in FIG. 4, in some aspects, process 400 may include determining whether to transmit HARQ feedback for the DCI communication (block 420). For example, the UE (e.g., using receive processor 258, transmit processor 264, controller/processor 280, memory 282, and/or the like) may determine whether to transmit HARQ feedback for the DCI communication, as described above.

As further shown in FIG. 4, in some aspects, process 400 may include selectively transmitting the HARQ feedback based at least in part on determining whether to transmit the HARQ feedback for the DCI communication (block 430). For example, the UE (e.g., using receive processor 258, transmit processor 264, controller/processor 280, memory 282, and/or the like) may selectively transmit the HARQ feedback based at least in part on determining whether to transmit the HARQ feedback for the DCI communication, as described above.

Process 400 may include additional aspects, such as any single aspect or any combination of aspects described below and/or in connection with one or more other processes described elsewhere herein.

In a first aspect, the downlink and/or uplink beam activation information includes at least one of information indicating an activation of a PDCCH TCI state, information indicating an activation of a PDSCH TCI state, information indicating an activation of a channel state information reference signal TCI state, information indicating an activation of a spatial relation for a PUCCH or a SRS, or information indicating activation of an uplink TCI state for a PUCCH, a physical uplink shared channel, a physical random access channel, or an SRS. In a second aspect, alone or in combination with the first aspect, the pathloss reference signal activation information includes information indicating an activation of a pathloss reference signal for a physical uplink control channel, a physical uplink shared channel, or a sounding reference signal.

In a third aspect, alone or in combination with one or more of the first and second aspects, the DCI communication only configures the beam or the pathloss reference signal. In a fourth aspect, alone or in combination with one or more of the first through third aspects, the DCI communication additionally dynamically schedules at least one of a downlink resource or an uplink resource. In a fifth aspect, alone or in combination with one or more of the first through fourth aspects, the DCI communication additionally activates at least one of downlink semi-persistent resources or uplink configured grant resources.

In a sixth aspect, alone or in combination with one or more of the first through fifth aspects, determining whether to transmit the HARQ feedback for the DCI communication comprises determining to transmit the HARQ feedback for the DCI communication, and selectively transmitting the HARQ feedback comprises transmitting the HARQ feedback based at least in part on determining to transmit the HARQ feedback for the DCI communication. In a seventh aspect, alone or in combination with one or more of the first through sixth aspects, determining to transmit the HARQ feedback for the DCI communication comprises determining to transmit the HARQ feedback for the DCI communication based at least in part on receiving an indication to transmit the HARQ feedback for the DCI communication, and the indication to transmit the HARQ feedback for the DCI communication is included in a radio resource control communication, a medium access control control element communication, the DCI communication, or another DCI communication.

In an eighth aspect, alone or in combination with one or more of the first through seventh aspects, determining to transmit the HARQ feedback for the DCI communication comprises determining to transmit the HARQ feedback for the DCI communication based at least in part on an indication, included in a specification, to transmit the HARQ feedback for the DCI communication. In a ninth aspect, alone or in combination with one or more of the first through eighth aspects, determining to transmit the HARQ feedback for the DCI communication comprises determining to transmit the HARQ feedback for the DCI communication based at least in part on a HARQ codebook type associated with the DCI communication.

In a tenth aspect, alone or in combination with one or more of the first through ninth aspects, transmitting the HARQ feedback comprises transmitting the HARQ feedback with repetition across a plurality of beams on at least one of a physical uplink control channel or a physical uplink shared channel. In an eleventh aspect, alone or in combination with one or more of the first through tenth aspects, transmitting the HARQ feedback with repetition across the plurality of beams comprises transmitting the HARQ feedback with repetition across the plurality of beams based at least in part on receiving an indication to transmit the HARQ feedback with repetition across the plurality of beams in at least one of a radio resource control communication, a medium access control control element communication, the DCI communication, or another DCI communication.

In a twelfth aspect, alone or in combination with one or more of the first through eleventh aspects, the HARQ feedback is at least one of spatial division multiplexed across the plurality of beams, time division multiplexed across the plurality of beams, or frequency division multiplexed across the plurality of beams. In a thirteenth aspect, alone or in combination with one or more of the first through twelfth aspects, transmitting the HARQ feedback with repetition across a plurality of beams comprises transmitting the HARQ feedback with repetition across a plurality of beams based at least in part on a timing offset relative to reception of the DCI communication.

In a fourteenth aspect, alone or in combination with one or more of the first through thirteenth aspects, the timing offset includes at least one of one or more symbols from an end of reception of the DCI communication to a start of a transmission of a first repetition of the HARQ feedback or one or more slots from the end of the reception of the DCI communication to the start of the transmission of the first repetition of the HARQ feedback. In a fifteenth aspect, alone or in combination with one or more of the first through fourteenth aspects, the timing offset includes at least one of one or more symbols from an end of reception of the DCI communication to a start of a transmission of a last repetition of the HARQ feedback or one or more symbols from the end of the reception of the DCI communication to the start of the transmission of the last repetition of the HARQ feedback.

In a sixteenth aspect, alone or in combination with one or more of the first through fifteenth aspects, the timing offset includes at least one of one or more symbols from an end of reception of the DCI communication to a start of a transmission of a repetition of the HARQ feedback between a first repetition of the HARQ feedback and a last repetition of the HARQ feedback or one or more symbols from the end of the reception of the DCI communication to the start of the transmission of the repetition of the HARQ feedback between the first repetition of the HARQ feedback and the last repetition of the HARQ feedback. In a seventeenth aspect, alone or in combination with one or more of the first through sixteenth aspects, process 400 includes receiving an indication of the timing offset in at least one of a radio resource control communication, a medium access control control element communication, the DCI communication, or another DCI communication.

In an eighteenth aspect, alone or in combination with one or more of the first through seventeenth aspects, transmitting the HARQ feedback for the DCI communication comprises transmitting the HARQ feedback for the DCI communication in an uplink communication, wherein the HARQ feedback for the DCI communication is multiplexed in the uplink communication with at least one of other uplink control information or uplink data, wherein a resource allocation for HARQ feedback for the DCI communication in the uplink communication is based at least in part on a value of a plurality of values indicated by a betaOffsetACK-Index parameter, and wherein the value is based at least in part on whether HARQ feedback information multiplexed in the uplink communication includes the HARQ feedback for the DCI communication or not.

In a nineteenth aspect, alone or in combination with one or more of the first through eighteenth aspects, transmitting the HARQ feedback comprises transmitting the HARQ feedback in an uplink communication, wherein the HARQ feedback is multiplexed in the uplink communication with at least one of other uplink control information or uplink data, wherein a resource allocation for HARQ feedback in the uplink communication is based at least in part on a value indicated by a betaOffsetACK-Index parameter signaled by a base station, and wherein the value is based at least in part on whether HARQ feedback information multiplexed in the uplink communication includes the HARQ feedback for the DCI communication or not.

In a twentieth aspect, alone or in combination with one or more of the first through nineteenth aspects, transmitting the HARQ feedback comprises transmitting the HARQ feedback after a timing offset relative to reception of the DCI communication, wherein the timing offset includes at least one of one or more symbols from an end of reception of the DCI communication to a start of a transmission of the HARQ feedback or one or more slots from the end of the reception of the DCI communication to the start of the transmission of the HARQ feedback. In a twenty-first aspect, alone or in combination with one or more of the first through twentieth aspects, process 400 includes receiving an indication of the timing offset in at least one of a radio resource is control communication, a medium access is control control element communication, the DCI communication, or another DCI communication.

In a twenty-second aspect, alone or in combination with one or more of the first through twenty-first aspects, determining whether to transmit the HARQ feedback for the DCI communication comprises determining to refrain from transmitting the HARQ feedback for the DCI communication, and selectively transmitting the HARQ feedback comprises refraining from transmitting the HARQ feedback based at least in part on determining to refrain from transmitting the HARQ feedback for the DCI communication. In a twenty-third aspect, alone or in combination with one or more of the first through twenty-second aspects, determining to refrain from transmitting the HARQ feedback for the DCI communication comprises determining to refrain from transmitting the HARQ feedback for the DCI communication based at least in part on receiving an indication to refrain from transmitting the HARQ feedback for the DCI communication, wherein the indication to refrain from transmitting the HARQ feedback for the DCI communication is included in a radio resource control communication, a medium access control control element communication, the DCI communication, or another DCI communication.

In a twenty-fourth aspect, alone or in combination with one or more of the first through twenty-third aspects, determining to refrain from transmitting the HARQ feedback for the DCI communication comprises determining to refrain from transmitting the HARQ feedback for the DCI communication based at least in part on an indication, included in a specification, to refrain from transmitting the HARQ feedback for the DCI communication. In a twenty-fifth aspect, alone or in combination with one or more of the first through twenty-fourth aspects, determining to refrain from transmitting the HARQ feedback for the DCI communication comprises determining to refrain from transmitting the HARQ feedback for the DCI communication based at least in part on a HARQ codebook type associated with the DCI communication.

In a twenty-sixth aspect, alone or in combination with one or more of the first through twenty-fifth aspects, determining whether to transmit HARQ feedback for the DCI communication includes determining whether to transmit HARQ feedback for the DCI communication based at least in part on at least one of whether the DCI communication additionally schedules resources or signals, whether the DCI communication additionally dynamically schedules resources or signals, or whether the DCI communication additionally activates resources or signals.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink control information (DCI) communication that includes:
     uplink transmission configuration indication (TCI) state information, and
     an indication of a timing offset between an end of the reception of the DCI communication and a hybrid automatic repeat request (HARQ) feedback for the DCI communication;
   determining whether to transmit the HARQ feedback for the DCI communication based at least in part on whether the DCI communication includes the uplink TCI state information and schedules other signals; and
   selectively transmitting the HARQ feedback for the DCI communication in a slot after the timing offset indicated by the DCI communication and based at least in part on determining whether to transmit the HARQ feedback for the DCI communication.

2. The method of claim 1, wherein the DCI communication further includes at least one of:
   information indicating an activation of a physical downlink control channel (PDCCH) TCI state,
   information indicating an activation of a physical downlink shared channel (PDSCH) TCI state,
   information indicating an activation of a channel state information reference signal TCI state,
   information indicating an activation of an uplink TCI state,
   pathloss reference signal activation information,
   information indicating an activation of a spatial relation for a physical uplink control channel (PUCCH) or a sounding reference signal (SRS), or
   information indicating an activation of the uplink TCI state for a PUCCH, a physical uplink shared channel, a physical random access channel, or an SRS.

3. The method of claim 1, wherein the DCI communication further includes pathloss reference signal activation information,
   wherein the pathloss reference signal activation information indicates an activation of a pathloss reference signal for a physical uplink control channel, a physical uplink shared channel, or a sounding reference signal, and
   wherein determining whether to transmit the HARQ feedback for the DCI communication comprises:
     determining whether to transmit the HARQ feedback for the DCI communication based at least in part on the pathloss reference signal activation information.

4. The method of claim 1, wherein the DCI communication only configures a pathloss reference signal.

5. The method of claim 1, wherein the DCI communication additionally dynamically schedules at least one of:
   a downlink resource, or
   an uplink resource.

6. The method of claim 1, wherein the DCI communication additionally activates at least one of:
   downlink semi-persistent resources, or
   uplink configured grant resources.

7. The method of claim 1, wherein determining whether to transmit the HARQ feedback for the DCI communication comprises:
   determining to transmit the HARQ feedback for the DCI communication; and
   wherein selectively transmitting the HARQ feedback for the DCI communication comprises:
     transmitting the HARQ feedback for the DCI communication based at least in part on determining to transmit the HARQ feedback for the DCI communication.

8. The method of claim 7, wherein determining to transmit the HARQ feedback for the DCI communication comprises:
   determining to transmit the HARQ feedback for the DCI communication based at least in part on receiving an indication to transmit the HARQ feedback for the DCI communication,
   wherein the indication to transmit the HARQ feedback for the DCI communication is included in:
     a radio resource control communication,
     a medium access control control element communication,
     the DCI communication, or
     another DCI communication.

9. The method of claim 7, wherein determining to transmit the HARQ feedback for the DCI communication comprises:
   determining to transmit the HARQ feedback for the DCI communication based at least in part on an indication, included in a specification, to transmit the HARQ feedback for the DCI communication.

10. The method of claim 7, wherein determining to transmit the HARQ feedback for the DCI communication comprises:
    determining to transmit the HARQ feedback for the DCI communication based at least in part on a HARQ codebook type associated with the DCI communication.

11. The method of claim 7, wherein transmitting the HARQ feedback for the DCI communication comprises:
    transmitting the HARQ feedback for the DCI communication with repetition across a plurality of beams on at least one of:
      a physical uplink control channel, or
      a physical uplink shared channel.

12. The method of claim 11, wherein transmitting the HARQ feedback for the DCI communication with repetition across the plurality of beams comprises:
    transmitting the HARQ feedback for the DCI communication with repetition across the plurality of beams based at least in part on receiving an indication to transmit the HARQ feedback for the DCI communication with repetition across the plurality of beams in at least one of:
a radio resource control communication,
a medium access control control element communication,
the DCI communication, or
another DCI communication.

13. The method of claim 11, wherein the HARQ feedback for the DCI communication is at least one of:
spatial division multiplexed across the plurality of beams,
time division multiplexed across the plurality of beams, or
frequency division multiplexed across the plurality of beams.

14. The method of claim 11, wherein transmitting the HARQ feedback for the DCI communication with repetition across the plurality of beams comprises:
transmitting the HARQ feedback for the DCI communication with repetition across the plurality of beams based at least in part on the timing offset.

15. The method of claim 14, wherein the timing offset includes at least one of:
one or more symbols from the end of the reception of the DCI communication to a start of a transmission of a first repetition of the HARQ feedback for the DCI communication, or
one or more slots from the end of the reception of the DCI communication to the start of the transmission of the first repetition of the HARQ feedback for the DCI communication.

16. The method of claim 14, wherein the timing offset includes:
one or more symbols from the end of the reception of the DCI communication to a start of a transmission of a last repetition of the HARQ feedback for the DCI communication.

17. The method of claim 14, wherein the timing offset includes:
one or more symbols from the end of the reception of the DCI communication to a start of a transmission of a particular repetition of the HARQ feedback for the DCI communication between a first repetition of the HARQ feedback for the DCI communication and a last repetition of the HARQ feedback for the DCI communication.

18. The method of claim 14, further comprising:
receiving the indication of the timing offset in at least one of:
a radio resource control communication,
a medium access control control element communication, or
another DCI communication.

19. The method of claim 7, wherein transmitting the HARQ feedback for the DCI communication comprises:
transmitting the HARQ feedback for the DCI communication in an uplink communication,
wherein the HARQ feedback for the DCI communication is multiplexed in the uplink communication with at least one of other uplink control information or uplink data,
wherein a resource allocation for HARQ feedback for the DCI communication in the uplink communication is based at least in part on a value of a plurality of values indicated by a betaOffsetACK-Index parameter, and
wherein the value is based at least in part on whether HARQ feedback information multiplexed in the uplink communication includes the HARQ feedback for the DCI communication or not.

20. The method of claim 7, wherein transmitting the HARQ feedback for the DCI communication comprises:
transmitting the HARQ feedback for the DCI communication in an uplink communication,
wherein the HARQ feedback for the DCI communication is multiplexed in the uplink communication with at least one of other uplink control information or uplink data,
wherein a resource allocation for HARQ feedback for the DCI communication in the uplink communication is based at least in part on a value indicated by a betaOffsetACK-Index parameter signaled by a network entity, and
wherein the value is based at least in part on whether HARQ feedback information multiplexed in the uplink communication includes the HARQ feedback for the DCI communication or not.

21. The method of claim 1, wherein the timing offset includes at least one of:
one or more symbols from the end of the reception of the DCI communication to a start of a transmission of the HARQ feedback for the DCI communication, or
one or more slots from the end of the reception of the DCI communication to the start of the transmission of the HARQ feedback for the DCI communication.

22. The method of claim 1, wherein determining whether to transmit the HARQ feedback for the DCI communication comprises:
determining to refrain from transmitting the HARQ feedback for the DCI communication; and
wherein selectively transmitting the HARQ feedback for the DCI communication comprises:
refraining from transmitting the HARQ feedback for the DCI communication based at least in part on determining to refrain from transmitting the HARQ feedback for the DCI communication.

23. The method of claim 22, wherein determining to refrain from transmitting the HARQ feedback for the DCI communication comprises:
determining to refrain from transmitting the HARQ feedback for the DCI communication based at least in part on an indication, included in a specification, to refrain from transmitting the HARQ feedback for the DCI communication.

24. The method of claim 22, wherein determining to refrain from transmitting the HARQ feedback for the DCI communication comprises:
determining to refrain from transmitting the HARQ feedback for the DCI communication based at least in part on a HARQ codebook type associated with the DCI communication.

25. A user equipment (UE) for wireless communication, comprising:
one or more memories; and
one or more processors coupled to the one or more memories, the one or more processors configured to cause the UE to:
receive a downlink control information (DCI) communication that includes:
uplink transmission configuration indication (TCI) state information, and an indication of a timing offset between an end of the reception of the DCI communication and a hybrid automatic repeat request (HARQ) feedback for the DCI communication;

determine whether to transmit the HARQ feedback for the DCI communication based at least in part on whether the DCI communication includes the uplink TCI state information and schedules other signals; and selectively transmit the HARQ feedback for the DCI communication in a slot after the timing offset indicated by the DCI communication and based at least in part on determination of whether to transmit the HARQ feedback for the DCI communication.

26. The UE of claim 25, wherein the one or more processors, to determine to transmit the HARQ feedback for the DCI communication, are configured to cause the UE to:

determine to transmit the HARQ feedback for the DCI communication based at least in part on at least one of:
the DCI communication additionally scheduling resources or the other signals,
the DCI communication additionally semi-persistently scheduling the resources or the other signals, or
the DCI communication additionally activating the resources or the other signals.

27. A non-transitory computer-readable medium storing one or more instructions for wireless communication, the one or more instructions comprising:

one or more instructions that, when executed by one or more processors of a user equipment (UE), cause the UE to:
receive a downlink control information (DCI) communication that includes:
uplink transmission configuration indication (TCI) state information, and
an indication of a timing offset between an end of the reception of the DCI communication and a hybrid automatic repeat request (HARQ) feedback for the DCI communication;
determine whether to transmit the HARQ feedback for the DCI communication based at least in part on whether the DCI communication includes the uplink TCI state information and schedules other signals; and
selectively transmit the HARQ feedback for the DCI communication in a slot after the timing offset indicated by the DCI communication and based at least in part on a determination of whether to transmit the HARQ feedback for the DCI communication.

28. The non-transitory computer-readable medium of claim 27, wherein the one or more instructions, that cause the UE to determine whether to transmit the HARQ feedback for the DCI communication, cause the UE to:

determine whether to transmit the HARQ feedback for the DCI communication based at least in part on at least one of:
whether the DCI communication additionally schedules resources,
whether the DCI communication additionally dynamically schedules the resources or the other signals, or
whether the DCI communication additionally activates the resources or the other signals.

29. An apparatus for wireless communication, comprising:

means for receiving a downlink control information (DCI) communication that includes:
uplink transmission configuration indication (TCI) state information, and
an indication of a timing offset between an end of the reception of the DCI communication and a hybrid automatic repeat request (HARQ) feedback for the DCI communication;
means for determining whether to transmit the HARQ feedback for the DCI communication based at least in part on whether the DCI communication includes the uplink TCI state information and schedules other signals; and
means for selectively transmitting the HARQ feedback for the DCI communication in a slot after the timing offset indicated by the DCI communication and based at least in part on determining whether to transmit the HARQ feedback for the DCI communication.

30. The apparatus of claim 29, wherein the means for determining whether to transmit the HARQ feedback for the DCI communication comprises:

means for determining whether to the transmit HARQ feedback for the DCI communication based at least in part on at least one of:
whether the DCI communication additionally schedules resources,
whether the DCI communication additionally dynamically schedules the resources or the other signals, or
whether the DCI communication additionally activates the resources or the other signals.

* * * * *